(12) United States Patent
Huntzicker et al.

(10) Patent No.: US 9,404,742 B2
(45) Date of Patent: Aug. 2, 2016

(54) DISTANCE DETERMINATION SYSTEM FOR A VEHICLE USING HOLOGRAPHIC TECHNIQUES

(71) Applicant: GM GLOBAL TECHNOLOGY OPERATIONS LLC, Detroit, MI (US)

(72) Inventors: Fred W. Huntzicker, Ann Arbor, MI (US); James N. Nickolaou, Clarkston, MI (US); Paul R. Williams, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 14/101,407

(22) Filed: Dec. 10, 2013

(65) Prior Publication Data
US 2015/0160003 A1 Jun. 11, 2015

(51) Int. Cl.
| | |
|---|---|
| H04N 7/18 | (2006.01) |
| G05D 1/00 | (2006.01) |
| G05D 3/00 | (2006.01) |
| G01B 11/25 | (2006.01) |
| B60R 11/04 | (2006.01) |
| B60R 1/00 | (2006.01) |
| G01C 3/26 | (2006.01) |
| G01S 17/89 | (2006.01) |
| G01S 17/93 | (2006.01) |
| G01B 11/02 | (2006.01) |
| G06F 7/00 | (2006.01) |

(52) U.S. Cl.
CPC ............... *G01B 11/254* (2013.01); *B60R 1/00* (2013.01); *B60R 11/04* (2013.01); *G01B 11/026* (2013.01); *G01C 3/26* (2013.01); *G01S 17/89* (2013.01); *G01S 17/936* (2013.01); *B60R 2300/107* (2013.01)

(58) Field of Classification Search
USPC ........ 348/136, 61, 64, 118; 701/1, 23, 28, 47, 701/57, 400, 408, 300, 301, 302
See application file for complete search history.

(56) References Cited

U.S. PATENT DOCUMENTS

| | | | | |
|---|---|---|---|---|
| 3,182,311 | A * | 5/1965 | Midlock | 342/28 |
| 3,706,495 | A * | 12/1972 | Dotson, Jr. | 356/28 |
| 3,756,683 | A * | 9/1973 | Smith, Jr. | 359/29 |
| 4,758,093 | A * | 7/1988 | Stern et al. | 356/608 |
| 4,800,256 | A * | 1/1989 | Broockman et al. | 235/462.28 |
| 5,073,710 | A * | 12/1991 | Takagi et al. | 250/231.14 |
| 5,870,179 | A * | 2/1999 | Cathey et al. | 356/4.01 |
| 5,875,108 | A * | 2/1999 | Hoffberg et al. | 700/17 |
| 5,901,246 | A * | 5/1999 | Hoffberg et al. | 382/209 |
| 6,023,356 | A * | 2/2000 | Kihara et al. | 359/23 |

(Continued)

*Primary Examiner* — Daquan Zhao
(74) *Attorney, Agent, or Firm* — Cantor Colburn LLP

(57) ABSTRACT

According to one aspect, a distance determination system for a vehicle includes an apparatus for generating and displaying a pattern generated by a holographic encoded medium in operable communication with an actuator and in communication with an electromagnetic radiation source configured to produce coherent electromagnetic waves. The distance determination system also includes an imager and a distance determination module in communication with the imager. The imager is configured to acquire image data representative of a field of view from the vehicle. The distance determination module is configured to locate at least one feature of the pattern in the image data and determine an estimated distance between the vehicle and the at least one feature based at least in part on a known position of the apparatus, a known position of the imager, and a layout of the pattern.

20 Claims, 5 Drawing Sheets

(56) References Cited

U.S. PATENT DOCUMENTS

| | | | |
|---|---|---|---|
| 6,356,854 B1* | 3/2002 | Schubert et al. | 702/150 |
| 6,418,424 B1* | 7/2002 | Hoffberg et al. | 706/21 |
| 6,450,816 B1* | 9/2002 | Gerber | 434/11 |
| 6,490,027 B1* | 12/2002 | Rajchel et al. | 356/4.01 |
| 8,462,204 B2* | 6/2013 | Schofield et al. | 348/115 |
| 2001/0029416 A1* | 10/2001 | Breed et al. | 701/45 |
| 2002/0029103 A1* | 3/2002 | Breed et al. | 701/45 |
| 2002/0049530 A1* | 4/2002 | Poropat | 701/207 |
| 2002/0181781 A1* | 12/2002 | Javidi et al. | 382/210 |
| 2003/0169469 A1* | 9/2003 | Takada | 359/15 |
| 2004/0037462 A1* | 2/2004 | Lewis et al. | 382/181 |
| 2005/0088947 A1* | 4/2005 | Ichihara et al. | 369/103 |
| 2005/0090962 A1* | 4/2005 | Ota et al. | 701/51 |
| 2007/0046449 A1* | 3/2007 | Koike et al. | 340/435 |
| 2007/0057781 A1* | 3/2007 | Breed | 340/457.1 |
| 2007/0164896 A1* | 7/2007 | Suzuki et al. | 342/70 |
| 2007/0193811 A1* | 8/2007 | Breed et al. | 180/271 |
| 2008/0079723 A1* | 4/2008 | Hanson et al. | 345/427 |
| 2008/0101196 A1* | 5/2008 | Jeong et al. | 369/103 |
| 2008/0195261 A1* | 8/2008 | Breed | 701/2 |
| 2009/0080317 A1* | 3/2009 | Martinez | 369/103 |
| 2009/0265061 A1* | 10/2009 | Watanabe et al. | 701/36 |
| 2011/0176190 A1* | 7/2011 | Golan et al. | 359/9 |
| 2013/0201446 A1* | 8/2013 | Hall et al. | 351/201 |
| 2013/0222874 A1* | 8/2013 | Sung et al. | 359/9 |
| 2014/0071506 A1* | 3/2014 | Han et al. | 359/9 |
| 2014/0268097 A1* | 9/2014 | Ko | 356/4.03 |
| 2015/0146270 A1* | 5/2015 | Huntzicker et al. | 359/13 |
| 2015/0198418 A1* | 7/2015 | Woida-O'Brien | |

* cited by examiner

DISTANCE DETERMINATION SYSTEM FOR A VEHICLE USING HOLOGRAPHIC TECHNIQUES

FIELD OF THE INVENTION

Exemplary embodiments of the invention relate to a distance determination system and, more particularly, to a distance determination system using holographic techniques in a vehicle.

BACKGROUND

Distance determination systems that provide a distance estimate between a vehicle and an object can be useful in a number of situations. As one example, parking in a relatively small garage or parking space may be challenging for some individuals. Incorrectly parking a vehicle in a confined garage space may result in damage to the vehicle body (e.g., caused by a garage door, another vehicle, or another obstruction). Park assist systems are used to indicate obstacles located in front of or behind a vehicle during parking. As one example, a vehicle may include one or more ultrasonic sensors that can be used to provide a distance estimate between the vehicle and an object or surface. While such ultrasonic sensor based systems can be useful relative to a large object or surface, they may have difficulty in detecting distances for non-uniform surfaces or objects.

As another example, some types of park assist systems include an imaging device such as a camera that is mounted to a front portion or a rear portion of the vehicle. The camera acquires image data that represents a viewable area either in front of or behind the vehicle. The park assist system may then provide feedback to the driver to indicate how to maneuver the vehicle into a garage or parking space. Such systems typically rely upon the driver to interpret the image data.

Accordingly, it is desirable to provide an improved distance determination system that overcomes these disadvantages.

SUMMARY OF THE INVENTION

In one exemplary embodiment of the invention, a distance determination system for a vehicle includes an apparatus for generating and displaying a pattern generated by a holographic encoded medium in operable communication with an actuator and in communication with an electromagnetic radiation source productive of coherent electromagnetic waves. The distance determination system also includes an imager and a distance determination module in communication with the imager. The imager is configured to acquire image data representative of a field of view from the vehicle. The distance determination module is configured to locate at least one feature of the pattern in the image data and determine an estimated distance between the imager and the at least one feature of the pattern based at least in part on a known position of the apparatus, a known position of the imager, and a layout of the pattern.

According to another embodiment, a method of distance determination in a vehicle includes directing coherent electromagnetic waves from an electromagnetic radiation source at a holographic encoded medium in operable communication with an actuator. The actuator is controlled to move the holographic encoded medium such that a pattern is generated. Image data is acquired representative of a field of view from the vehicle. At least one feature of the pattern is located in the image data to establish a detected position of the at least one feature in the image data. An estimated distance between the imager and the at least one feature is determined based at least in part on a known position of the apparatus, a known position of the imager, and a layout of the pattern.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
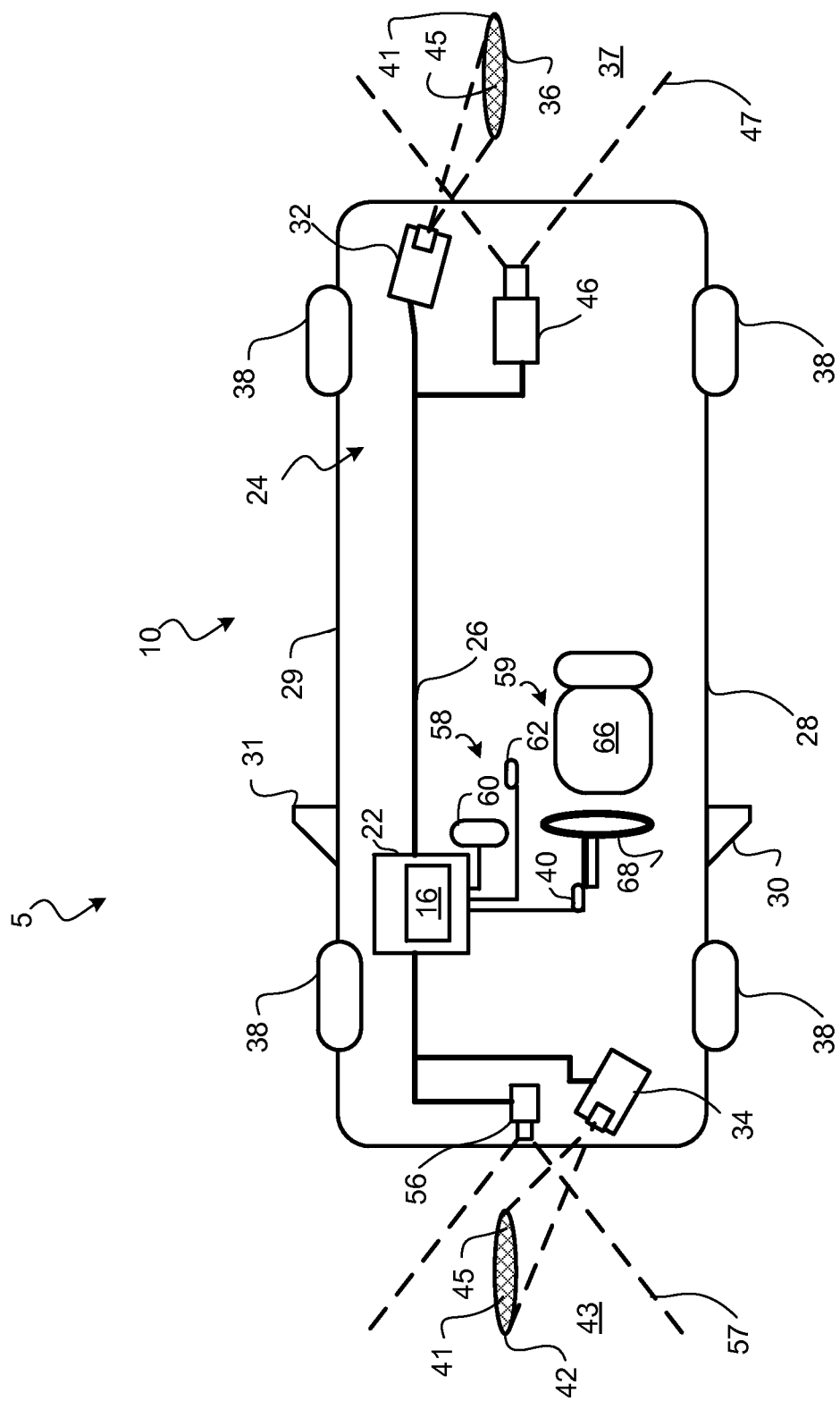
FIG. 1 is an illustration of an exemplary distance determination system in a vehicle, in accordance with an embodiment of the invention.

The following description is merely exemplary in nature and is not intended to limit the present disclosure, its application or uses. It should be understood that throughout the drawings, corresponding reference numerals indicate like or corresponding parts and features. As used herein, the terms module and sub-module refer to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment of the invention a vehicle is equipped with a holographic encoded medium that includes a holographic pattern. The holographic encoded medium is driven by an actuator to induce movement of the holographic pattern relative to an electromagnetic radiation source operable to direct coherent electromagnetic waves at the holographic pattern. Coherent electromagnetic waves refer to electromagnetic radiation that has a common frequency and phase, and may include any portion of the electromagnetic spectrum, such as visible or invisible light as well as other known forms of electromagnetic radiation. Control of the electromagnetic radiation source is synchronized with movement of the holographic encoded medium to direct coherent electromagnetic waves at targeted portions of the holographic encoded medium at predetermined times such that the holographic pattern produces a projected image pattern on a projection surface. At least one feature of the projected image pattern is detected and a distance is calculated based at least in part on a known position of a holographic projection apparatus, a known position of an imager/camera, and a layout of the projected image pattern.

In accordance with an exemplary embodiment of the invention a distance determination system 5 is shown generally as part of a vehicle 10 in FIG. 1. The vehicle 10 can be any ground-based vehicle, such as an automobile, truck, or the like for example. The distance determination system 5 includes a distance determination module 16 which may be integrated with or in communication with a park assist control module 22. Although the distance determination system 5 is depicted as part of the vehicle 10, the distance determination system 5 can be used in other environments and may be portable or distributed between multiple structures.

The park assist control module 22 is configured to interface with a plurality of vehicle systems 24 using a vehicle communication network 26. The park assist control module 22 may interface directly with the distance determination module 16 or may communicate with the distance determination module 16 via the vehicle communication network 26. The vehicle communication network 26 can include a number of interfaces and communication links. For example, the park assist control module 22 may interface with a rear-facing apparatus 32, a front-facing apparatus 34, a steering angle sensor 40, a rear-facing imager 46, a front-facing imager 56, and other vehicle sensor systems known in the art.

The rear-facing apparatus 32 is operable for generating and displaying a pattern 36 on a rear projection surface 37. Similarly, the front-facing apparatus 34 is operable for generating and displaying a pattern 42 on a front projection surface 43. The patterns 36 and 42 can be within or outside of a human-visible range of wavelengths emitted by the apparatuses 32 and 34 based on electromagnetic radiation sources operable to direct coherent electromagnetic waves. The rear projection surface 37 and the front projection surface 43 may be a driving surface, e.g., the ground, upon which the road wheels 38 of the vehicle 10 travel. When the vehicle 10 is maneuvered into proximity with other objects or surfaces, such as in a parking situation, the rear projection surface 37 may differ from the front projection surface 43 to include one or more vertical, angled or non-planar objects or surfaces, e.g., other vehicles.

The rear-facing imager 46 acquires image data regarding a rear viewable area or field of view (FOV) 47. The rear-facing apparatus 32 is configured to display the pattern 36 on the rear projection surface 37 in the FOV 47 such that it is detectable by the rear-facing imager 46 as image data. Similarly, the front-facing imager 56 acquires image data regarding a front viewable area or FOV 57. The front-facing apparatus 34 is configured to display the pattern 42 on the front projection surface 43 in the FOV 57 such that it is detectable by the front-facing imager 56. The rear-facing imager 46 and front-facing imager 56 may each comprise a single lens, non-stereographic camera, where the FOV 47 does not overlap with the FOV 57. The distance determination system 5 may also include other imagers to capture other fields of view (not depicted). For example, one or more imagers can be installed on a driver side 28 of the vehicle 10, e.g., integrated with a driver-side mirror 30. Additionally, one or more imagers can be installed on a passenger side 29 of the vehicle 10, e.g., integrated with a passenger-side mirror 31 or active safety sensors (not depicted). Each additional imager may have a corresponding apparatus for generating and displaying a pattern for distance determination. Imagers, such as the rear-facing imager 46 and front-facing imager 56, need not be sensitive to only human-visible light but can be configured to detect a variety of electromagnetic wavelengths in the electromagnetic spectrum. For example, imagers in embodiments can operate at a visible light wavelength, an ultraviolet wavelength, an infrared wavelength, or a radio wavelength. Each imager, such as the rear-facing imager 46 and front-facing imager 56, can include a sensing array, e.g., a charge-coupled device, configured to detect an electromagnetic wavelength corresponding to coherent electromagnetic waves emitted by the apparatuses 32 and 34.

The park assist control module 22 may also interface with a variety input/output devices 58 in a cabin 59 of the vehicle 10, such as a user interface 60 and a transmission gear selector 62. The input/output devices 58 are located proximate to a vehicle operator position 66. The user interface 60 may be a touch-screen based system or other non-touch display system with associated inputs, such as buttons. The transmission gear selector 62 may be used to select which imager to use for distance estimation. For example, when the transmission gear selector 62 is in reverse, the rear-facing imager 46 can be used for distance estimation, while the front-facing imager 56 can be used for distance estimation when the transmission gear selector 62 is in a forward drive setting/gear. The steering angle sensor 40 can produce a steering angle relative to the road wheels 38 and/or a current position of a vehicle steering wheel 68. Both a longitudinal trajectory and rotation (e.g., lateral) angle may be set and adjusted for imagers of the vehicle 10 when the transmission gear selector 62 is in any state. For example, the rear-facing imager 46 and the front-facing imager 56 can be actively repositioned to provide a desired field of view. In another embodiment, the rear-facing imager 46 and the front-facing imager 56 are installed at fixed known positions relative to the vehicle 10.

Regardless of whether positions of the imagers 46, 56 and/or the apparatuses 32, 34 are fixed or adjustable, the distance determination module 16 knows position information of the imagers 46, 56 and the apparatuses 32, 34 relative to the vehicle 10 as a frame of reference. For example, in a fixed configuration, positional information can be stored as constant values which may define position in multiple axes relative to one or more reference points on the vehicle 10. In an adjustable configuration, one or more position sensors (not depicted) can provide position information, e.g., angles relative to one or more reference points, such that the position of the imagers 46, 56 and the apparatuses 32, 34 is known to the distance determination module 16.

In an exemplary embodiment, the distance determination module 16 controls display of the pattern 36 by the apparatus 32 and capturing of associated image data by the rear-facing imager 46, and/or display of the pattern 42 by the apparatus 34 and capturing of associated image data by the front-facing imager 56. The distance determination module 16 is configured to locate at least one feature 41 of the pattern 36, 42 in the image data and determine an estimated distance between the imager 46, 56 and the at least one feature 41 based at least in part on a known position of the apparatus 32, 34, a known position of the imager 46, 46, and a layout of the pattern 36, 42. Changes in the image data can be detected as observed movement of the at least one feature 41 relative to a known time difference between capture times of multiple instances of image data. Observed movement of the at least one feature 41 may also or alternatively be determined relative to at least one other feature 45. Tracking the same feature at different positions can be used to determine multiple distance estimates and may also be used for error checking for unusually large variations.

A feature 41, 45 can be a particular pattern or a centroid of a pattern that is used to determine an absolute or relative location. Since the distance determination module 16 controls display of the pattern 36, 42 along with capturing of image data and can be programmed with knowledge of placement and angles of the apparatuses 32, 34 and imagers 46, 56 relative to the vehicle 10, triangulation techniques known in the art can be used to estimate distances between the vehicle 10 and objects or surfaces upon which the pattern 36, 42 is displayed. Estimated distances may be defined in terms of the vehicle 10 of FIG. 1 as a furthest protruding point based on a direction of travel, e.g., a front bumper when going forward and a rear bumper when going in reverse. Additional state information of the vehicle 10 can be considered when calculating estimated distances such as steering angle and position of road wheels 38 of the vehicle 10. Estimated distances can be confirmed by using multiple calculation iterations to filter outlier data points that may be induced by noise, lighting variations, and other potential error sources.

Although the example of FIG. 1 depicts a rear-facing imager 46 with a corresponding rear-facing apparatus 32 and a front-facing imager 56 with a corresponding front-facing apparatus 34, embodiments are not so limited. Embodiments can include additional or fewer imagers and apparatuses. For example, only the rear-facing imager 46 with the rear-facing apparatus 32 may be included in an embodiment of the vehicle 10. Additionally, there need not be a one-to-one relationship between an imager and an apparatus for generating and displaying a pattern. For instance, multiple apparatuses can be used to create separate or overlapping patterns within a FOV of an imager. In another embodiment, multiple imagers have an overlapping FOV directed at a pattern generated by a single apparatus.

Figure 2:
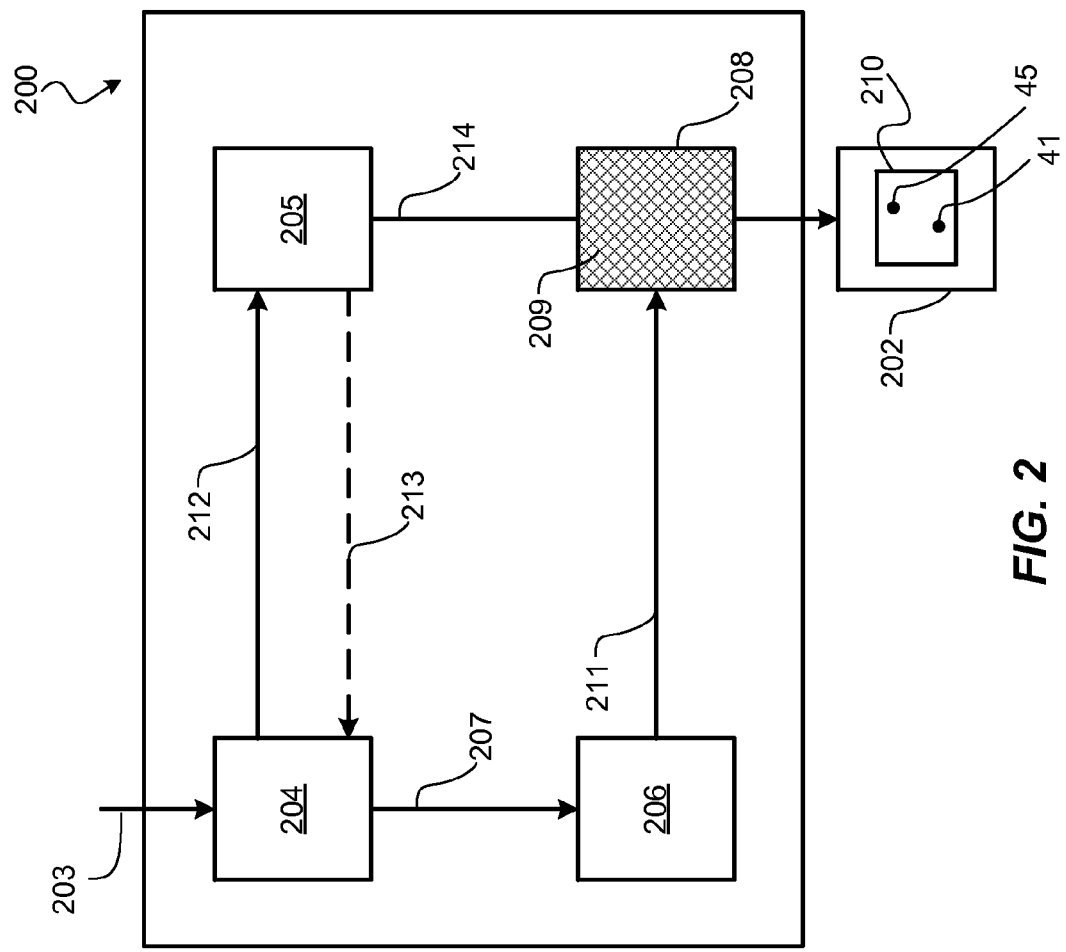
FIG. 2 depicts a block schematic diagram of an apparatus configured to generate and display a pattern on a projection surface, in accordance with an embodiment of the invention.

FIG. 2 depicts a block schematic diagram of an apparatus 200 configured to generate and display a pattern 210 on a projection surface 202, in accordance with an embodiment of the invention. The apparatus 200 is an exemplary embodiment of the rear-facing apparatus 32 and/or the front-facing apparatus 34 of FIG. 1. Accordingly, the pattern 210 may represent the pattern 36 and/or the pattern 42 of FIG. 1, and the projection surface 202 may represent the rear projection surface 37 and/or the front projection surface 43 of FIG. 1. The projection surface 202 represents a surface that is external to and not part of the vehicle 10 of FIG. 1. The pattern 210 includes at least one feature 41 to track for distance estimation and may include at least one other feature 45 for distance estimation.

In an embodiment, the apparatus 200 includes a controller 204, an actuator 205, an electromagnetic radiation source 206 productive of coherent electromagnetic waves 211 disposed in operable communication with the actuator 205, and a holographic encoded medium 208 disposed in communication with the electromagnetic radiation source 206, the holographic encoded medium 208 including a holographic pattern 209. The actuator 205 can be any type of device operable to control movement of the holographic encoded medium 208, including a motor or non-motor based device, such as a memory metal device, a piezoelectric device, and the like. The electromagnetic radiation source 206 can output a particular electromagnetic wavelength selected to correspond with sizing of the holographic pattern 209. For example, the electromagnetic radiation source 206 can be a laser, radio frequency transmitter, or other source of coherent electromagnetic waves. The controller 204 is operable to control synchronization of the coherent electromagnetic waves 211 from the electromagnetic radiation source 206 with a position of the holographic encoded medium 208 as driven by the actuator 205 to produce a pattern 210 on a projection surface 202 based on directing the coherent electromagnetic waves 211 to different portions of the holographic pattern 209 at different times. In an embodiment, the controller 204 drives a pulse control signal 207 to the electromagnetic radiation source 206 to control synchronization of the coherent electromagnetic waves 211 with the holographic encoded medium 208. The controller 204 provides at least one control signal 212 to the actuator 205 to enable and control movement of the holographic encoded medium 208 operably connected to the actuator 205 at coupling 214. The controller 204 can also receive a feedback signal 213 from the actuator 205 to support a feedback control loop. The feedback signal 213 can provide a position or velocity associated with the actuator 205 and/or the holographic encoded medium 208.

In an embodiment, the pattern 210 may be a non-homogeneous pattern, an outline of a geometric shape, a logo, one or more alphanumeric characters, an image of any kind, a shape of any kind, or any combination of the foregoing patterns. Furthermore, the pattern 210 may be two-dimensional (2D) or three-dimensional (3D) and movable in time. Movement of the pattern 210 may be in the form of changing a display pattern over a period of time, repositioning the display pattern over a period of time, or a combination thereof.

As discussed above, the pattern 210 may take on different layouts, but it may also alternate between different layouts, and it may intermittently, simultaneously or consecutively display the same layout or alternate layouts at different time intervals. For example, and with reference now to FIGS. 1-3, when the apparatus 200 is used for navigation or driving assistance, the pattern 210 is a visible light pattern and may be a left turn arrow 210.1, a straight arrow 210.2, or a right turn arrow 210.3, where display of a particular arrow 210.1-210.3 can be determined based on apparatus commands 203 received at the controller 204 of FIG. 2. The apparatus commands 203 may be received on vehicle communication network 26 from the distance determination module 16 of FIG. 1. The distance determination module 16 of FIG. 1 may select apparatus commands 203 based on a detected state of the vehicle 10 of FIG. 1 to generate known pattern layouts. For example, a steering angle determined via steering angle sensor 40 of FIG. 1 can result in changes to the apparatus commands 203 for steering-sensitive light patterns such as an arrow direction.

In an embodiment, the apparatus 200 is operable to produce any of the arrows 210.1-210.3 individually with movement being in the form of changes in length 216 and/or width 218. For example, the arrows 210.1-210.3 may vary in time from a small pattern to a large pattern, or vice versa, with any number of intermediate sized pattern layouts being displayed in between in a succession of images from the first size to the second size. In another embodiment, display of the arrows 210.1-210.3 turns off and on at fixed or variable time intervals. Each of the arrows 210.1-210.3 may be used as a feature 41 of FIGS. 1 and 2 to be tracked for changes detected between the multiple instances of time. In another embodiment, one or more sub-features, such as arrowhead 215, are used as features 41 of FIGS. 1 and 2 to detect changes in image data between the multiple instances of time. An arrow tail 217 is an example of at least one other feature 45 of FIGS. 1 and 2 that can be observed relative to at least one feature 41 of FIGS. 1 and 2, such as arrowhead 215.

Figure 4:
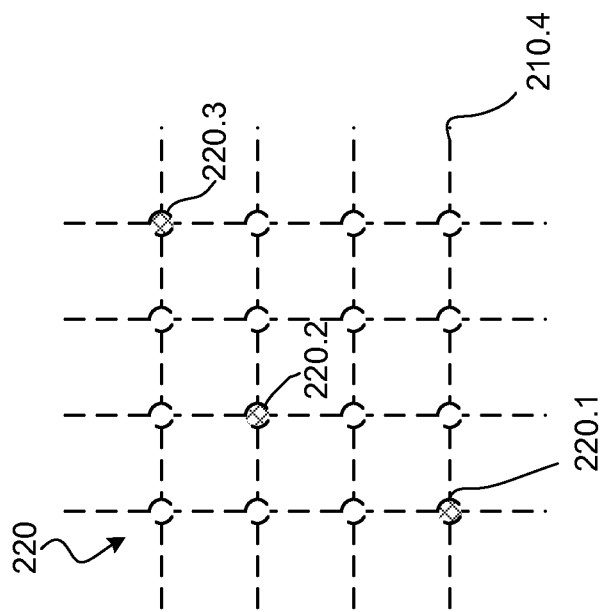
FIGS. 3 and 4 depict a plurality of patterns, in accordance with an embodiment of the invention.

FIG. 4 depicts a grid pattern 210.4 as a layout of pattern 210 of FIG. 2 in accordance with an embodiment of the invention. In the example of FIG. 4, the grid pattern 210.4 can change dynamically in size. In another embodiment, the grid pattern 210.4 is not displayed but used as an alignment reference for a plurality of grid-spaced images 220. The grid-spaced images 220 can be simple patterns such as dots or points of light or focused electromagnetic energy. The grid-spaced images 220 need not all be output at once but can be projected in a fixed or random sequence. As one example, an across and up/down raster-type projection and scanning sequence can be used. As another example, at a first time interval a grid-spaced image 220.1 is projected, at a second time interval a grid-spaced image 220.2 is projected, and at a third time interval a grid-spaced image 220.3 is projected. Selectively projecting the grid-spaced images 220 appears as the pattern 210, where at least one illuminated instance of a grid-spaced image 220.1-220.3 provides at least one feature 41 of FIGS. 1 and 2 which may also be tracked to detect changes in image data between multiple instances of time. The grid pattern 210.4 and/or the grid-spaced images 220 can be displayed at a relatively low level of intensity to reduce visibility to humans when a visible electromagnetic wavelength is used while still being detectible by an imager, such as imagers 46, 56 of FIG. 1. In another embodiment, the grid pattern 210.4 and/or the grid-spaced images 220 can be displayed in a wavelength not visible to humans but detectable by an imager, e.g. an infrared camera.

Figure 3:
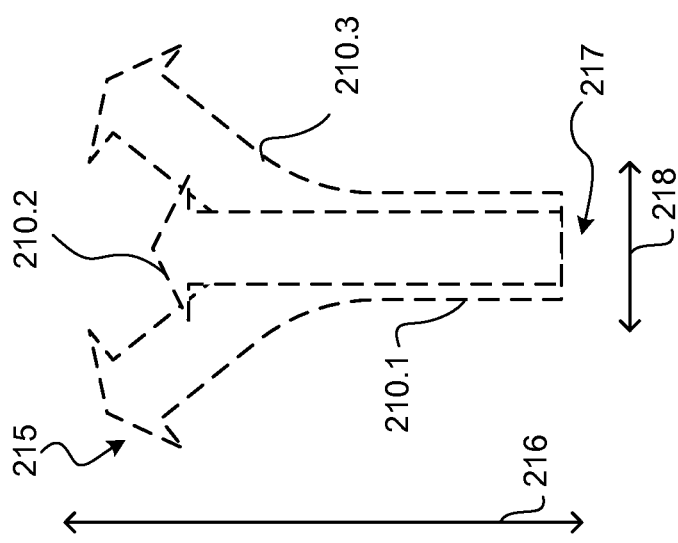

While embodiments disclosed herein refer to particular geometric shapes for the pattern 210 illustrated in FIGS. 3 and 4, it will be appreciated that such reference is for discussion purpose only and that the scope of the invention is not limited to only the particular shapes mentioned. Alternative shapes and sizes to those discussed herein are contemplated and considered to be within the scope of the disclosed invention. For example, an apparently random pattern such as a quick response (QR)-type code can be used as a layout of the pattern 210. While embodiments disclosed herein refer to only three arrows 210.1-210.3 and a grid pattern 210.4 with three illuminated grid-spaced images 220.1-220.3, it will be appreciated that such reference is for discussion purposes only and that the scope of the invention is not so limited, but encompasses any number of patterns suitable for a purpose disclosed herein.

Referring to FIG. 2, in an embodiment, the controller 204 is in signal communication with the actuator 205, the electromagnetic radiation source 206, and one or more other systems providing apparatus commands 203. In an embodiment, a control algorithm executed by the controller 204 is operative to create the pattern 210 responsive to a detected state change of the vehicle 10 of FIG. 1, as may be indicated by the apparatus commands 203, and in accordance with other embodiments disclosed herein. Furthermore, by utilizing the controller 204 to change the position of holographic encoded medium 208 relative to the electromagnetic radiation source 206, it is contemplated that the pattern 210 may be created.

Figure 5:
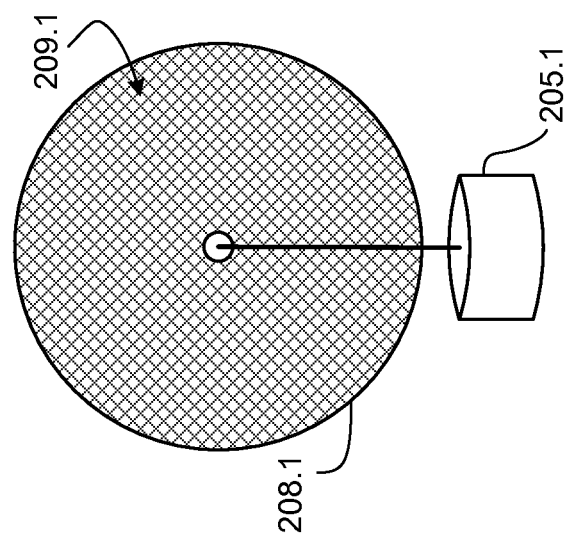
FIG. 5 depicts an example of a holographic encoded medium and an actuator, in accordance with an embodiment of the invention.

FIG. 5 depicts an example of a holographic encoded medium 208.1 and an actuator 205.1 in accordance with an embodiment of the invention. In the embodiment of FIG. 5, the holographic encoded medium 208.1 is a disk, such as an optical disk, and the actuator 205.1 is a motor operable to spin the disk. The actuator 205.1 can be a direct current (DC) motor, such as a hard-drive motor, controlled by the controller 204 of FIG. 2. The holographic encoded medium 208.1 includes a holographic pattern 209.1 operable to create a pattern 210 in combination with the electromagnetic radiation source 206 and the controller 204 of FIG. 2. The holographic pattern 209.1 can be encoded onto the holographic encoded medium 208.1 using known holographic pattern creation techniques. Timing pulsation of the electromagnetic radiation source 206 via pulse control signal 207 of FIG. 2 enables synchronization of the coherent electromagnetic waves 211 with a desired portion of the holographic pattern 209.1 to collectively produce the pattern 210.

Figure 6:
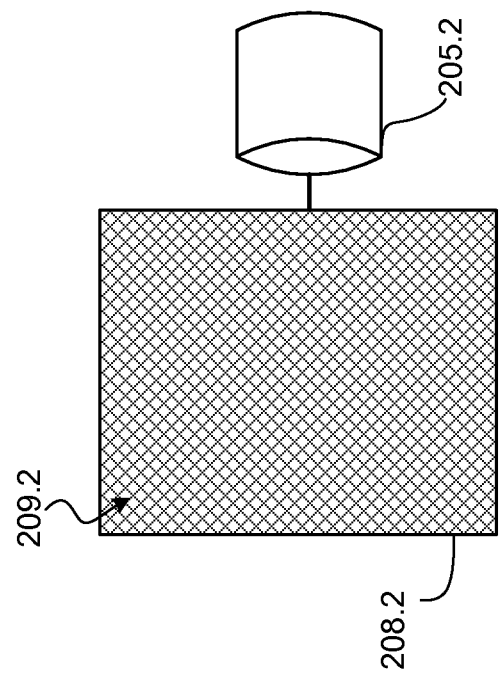
FIG. 6 depicts another example of a holographic encoded medium and an actuator, in accordance with an embodiment of the invention.

FIG. 6 depicts another example of a holographic encoded medium 208.2, and an actuator 205.2 in accordance with an embodiment of the invention. In the example of FIG. 6, the actuator 205.2 is a piezoelectric device operable to vibrate the holographic encoded medium 208.2. Vibration of the holographic encoded medium 208.2 can be controlled by at least one control signal 212 generated by the controller 204 of FIG. 2 to induce a controlled oscillating motion. Timing pulsation of the electromagnetic radiation source 206 via pulse control signal 207 of FIG. 2 enables synchronization of the coherent electromagnetic waves 211 with a desired portion of the holographic pattern 209.2 to collectively produce the pattern 210.

Figure 7:
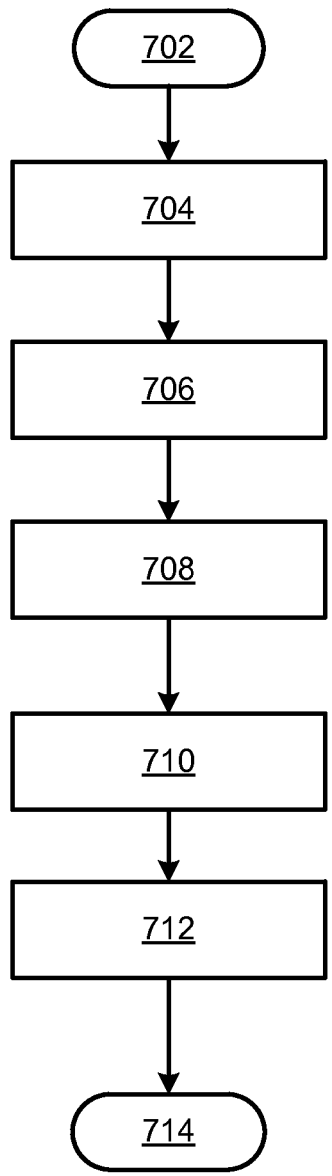
FIG. 7 is a process flow diagram illustrating a method of distance determination using holographic techniques in a vehicle, in accordance with an embodiment of the invention.

FIG. 7 is an exemplary process flow diagram illustrating a method 700 for distance determination for the vehicle 10 of FIG. 1. Accordingly, the method 700 is described in reference to FIGS. 1-7. As can be appreciated in light of the disclosure, the order of operations within the method 700 is not limited to the sequential execution as illustrated in FIG. 7, but may be performed in one or more varying orders as applicable and in accordance with the present disclosure. As can further be appreciated, one or more steps may be added or removed without altering the spirit of the method.

Method 700 begins at block 702 and can be performed periodically when distance determination is enabled. At step 704, coherent electromagnetic waves 211 are directed from an electromagnetic radiation source 206 at a holographic encoded medium 208 in operable communication with an actuator 205. The electromagnetic radiation source 206 may be a laser or other source of electromagnetic radiation.

At step 706, the actuator 205 is controlled to move the holographic encoded medium 208 such that a pattern 210 is generated. The holographic encoded medium 208 includes a holographic pattern 209. The pattern 210 is generated based on directing the coherent electromagnetic waves 211 at the holographic pattern 209 while the holographic encoded medium 208 is driven to move by the actuator 205. The holographic encoded medium 208 can be a disk, e.g., holographic encoded medium 208.1, and the actuator 205 may be a motor operable to spin the optical disk, e.g., actuator 205.1. In another embodiment, the actuator 205 is a piezoelectric device, e.g., actuator 205.2, operable to vibrate holographic encoded medium 208.2. The pattern 210, which can be a moving light pattern, may be selected based on a detected state of the vehicle 10.

At block 708, image data representative of a field of view, such as FOV 47 or 57 of FIG. 1, from the vehicle 10 is acquired by an imager such as the rear-facing imager 46 or the front-facing imager 56 of FIG. 1. At block 710, at least one feature 41 of the pattern 210 is located in the image data. The at least one feature 41 may be an arrow 210.1-210.3, an arrowhead 215, a grid pattern 210.4, one or more grid-spaced images 220, or other such features. An image processing technique, such as a scale-invariant feature transform, can be used to locate the at least one feature 41 of the pattern 210 in the image data and establish a detected position of the at least one feature 41. An expected position of the at least one feature 41 in the image data can be determined based on position data associated with the holographic encoded medium 208 in combination with a known position of the imager, such as the rear-facing imager 46 or the front-facing imager 56 of FIG. 1, relative to the vehicle 10.

At block 712, an estimated distance is determined between the vehicle 10 and the at least one feature 41 based at least in part on a known position of the apparatus 200, a known position of the imager 46, 56, and a layout of the pattern 210 using, for example, triangulation techniques. Changes may be detected in the image data between multiple instances of time as observed movement of the at least one feature 41. The observed movement of the at least one feature 41 can be determined relative to at least one other feature 45, e.g., a difference between grid-spaced images 220.1, grid-spaced images 220.2, and grid-spaced images 220.3 or between arrowhead 215 and arrow tail 217. Changes in pattern 210 may occur at such a high frequency that the changes detected in the image data between the multiple instances of time are primarily attributable to movement of the holographic encoded medium 208 by the actuator 205 rather than movement of the vehicle 10.

Feedback from the actuator 205 can be passed as feedback signal 213 to the controller 204, rescaled as needed, and sent to the distance determination module 16 of FIG. 1 to assist in determining position data associated with the holographic encoded medium 208. The distance determination module 16 of FIG. 1 may determine the estimated distance based on the position data in combination with the known position of the imager relative to the vehicle 10. For example, position data from feedback signal 213 may assist in determining which features 41, 45 of the pattern 210 should appear in a FOV of an imager, and may also be used to determine an expected location of the features 41, 45 of the pattern 210 in the FOV. Depending upon implementation, monitoring expected changes in the image data versus observed changes in the image data over a period of time can be used to determine multiple estimated distances using triangulation techniques known in the art. As the pattern 210 can cover a large area or target a specific portion of the FOV, multiple distance estimates can be provided based on observed differences in the pattern 210 which may be attributable to contoured surfaces or multiple objects with the FOV. Where multiple distance estimates are determined for different portions of the image data, the distance determination module 16 of FIG. 1 can tag and overlay the estimated distances on images displayed on the user interface 60 of FIG. 1.

The method 700 ends at 714.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A distance determination system for a vehicle, the distance determination system comprising:
   an apparatus for generating and displaying a pattern generated by a holographic encoded medium in operable communication with an actuator and an electromagnetic radiation source configured to produce coherent electromagnetic waves;
   an imager configured to acquire image data representative of a field of view from the vehicle; and
   a distance determination module in communication with the imager and configured to locate at least one feature of the pattern in the image data and determine an estimated distance between the vehicle and the at least one feature based on a known position of the apparatus, a known position of the imager, and a layout of the pattern.

2. The distance determination system of claim 1, wherein the distance determination module is further configured to detect changes in the image data between multiple instances of time as observed movement of the at least one feature.

3. The distance determination system of claim 2, wherein the observed movement of the at least one feature is determined relative to at least one other feature.

4. The distance determination system of claim 2, wherein the changes detected in the image data between the multiple instances of time are primarily attributable to movement of the holographic encoded medium by the actuator.

5. The distance determination system of claim 1, wherein the apparatus is operable to provide position data associated with the holographic encoded medium to the distance determination module, and the distance determination module is further configured to determine an expected position of the at least one feature based on the position data in combination with the known position of the imager relative to the vehicle.

6. The distance determination system of claim 1, wherein the holographic encoded medium comprises a holographic pattern, and the pattern is generated based on directing the coherent electromagnetic waves at the holographic pattern while the holographic encoded medium is driven to move by the actuator.

7. The distance determination system of claim 1, wherein the imager comprises a sensing array configured to detect an electromagnetic wavelength corresponding to the coherent electromagnetic waves.

8. The distance determination system of claim 1, wherein the holographic encoded medium is a disk, and the actuator is a motor operable to spin the disk.

9. The distance determination system of claim 1, wherein the actuator is a piezoelectric device operable to vibrate the holographic encoded medium.

10. The distance determination system of claim 1, wherein the pattern is selected based on a detected state of the vehicle.

11. A method of distance determination in a vehicle, the method comprising:
   directing coherent electromagnetic waves from an electromagnetic radiation source at a holographic encoded medium in operable communication with an actuator;
   controlling the actuator to move the holographic encoded medium such that a pattern is generated;
   acquiring image data representative of a field of view from the vehicle;
   locating at least one feature of the pattern in the image data to establish a detected position of the at least one feature in the image data; and
   determining an estimated distance between the vehicle and the at least one feature based on a known position of the apparatus, a known position of the imager, and a layout of the pattern.

12. The method of claim 11, further comprising:
   detecting changes in the image data between multiple instances of time as observed movement of the at least one feature.

13. The method of claim 12, wherein the observed movement of the at least one feature is determined relative to at least one other feature.

14. The method of claim 12, wherein the changes detected in the image data between the multiple instances of time are primarily attributable to movement of the holographic encoded medium by the actuator.

15. The method of claim 11, further comprising:
  determining position data associated with the holographic encoded medium; and
  determining an expected position of the at least one feature based on the position data in combination with the known position of the imager relative to the vehicle.

16. The method of claim 11, wherein the holographic encoded medium comprises a holographic pattern, and the pattern is generated based on directing the coherent electromagnetic waves at the holographic pattern while the holographic encoded medium is driven to move by the actuator.

17. The method of claim 11, wherein the imager comprises a sensing array configured to detect an electromagnetic wavelength corresponding to the coherent electromagnetic waves.

18. The method of claim 11, wherein the holographic encoded medium is a disk, and the actuator is a motor operable to spin the disk.

19. The method of claim 11, wherein the actuator is a piezoelectric device operable to vibrate the holographic encoded medium.

20. The method of claim 11, further comprising selecting the pattern based on a detected state of the vehicle.

\* \* \* \* \*